T. B. JEFFERY.
GEARING.
APPLICATION FILED FEB. 23, 1904.
900,857.
Patented Oct. 13, 1908.
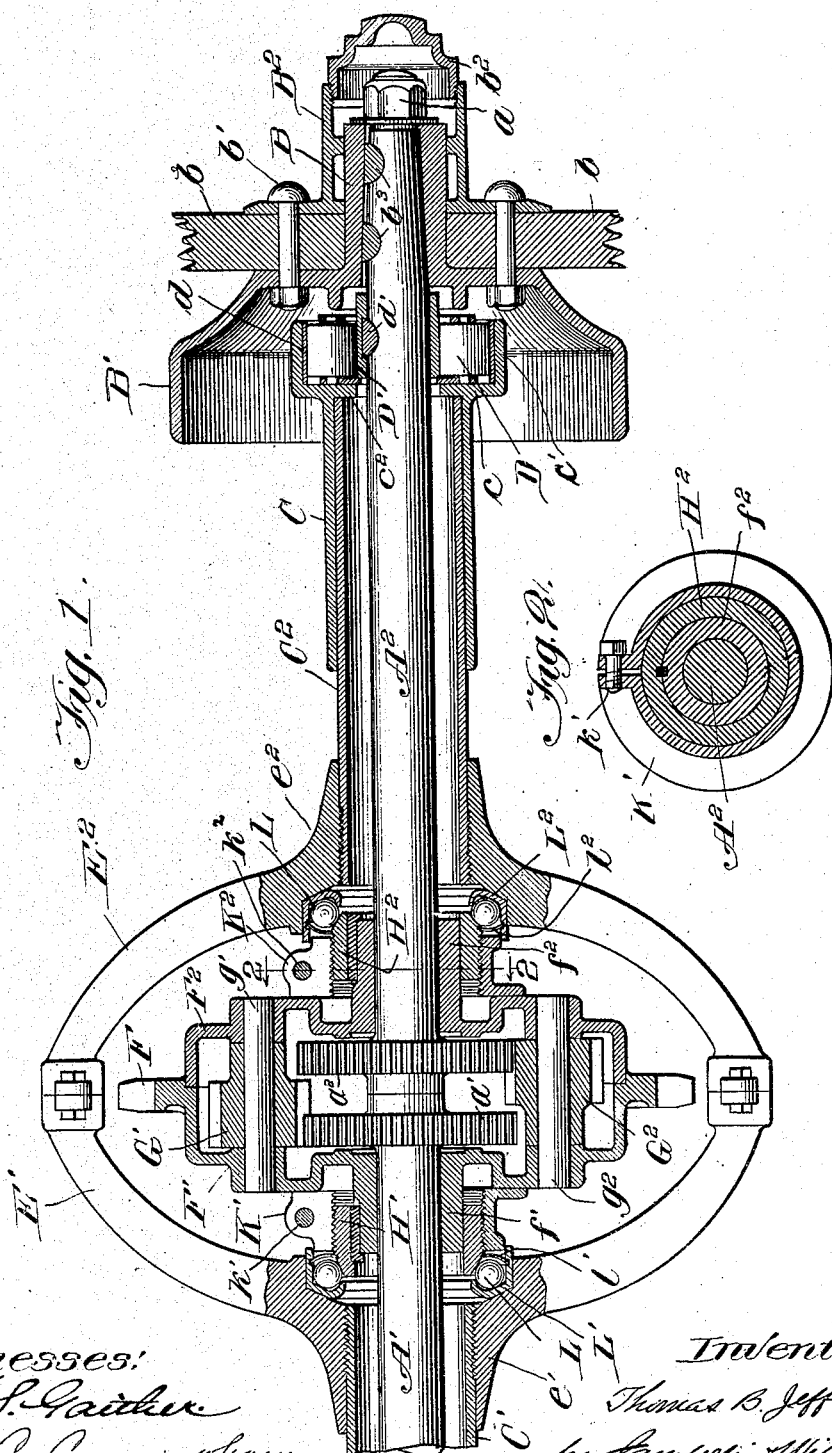

UNITED STATES PATENT OFFICE.

THOMAS B. JEFFERY, OF KENOSHA, WISCONSIN.

GEARING.

No. 900,857.

Specification of Letters Patent.

Patented Oct. 13, 1908.

Application filed February 23, 1904. Serial No. 194,761.

*To all whom it may concern:*

Be it known that I, THOMAS B. JEFFERY, a citizen of the United States, residing at Kenosha, county of Kenosha, State of Wisconsin, have invented a certain new and useful Improvement in Gearing, and declare the following to be a full, clear, and exact description of the same, such as will enable others skilled in the art to which it pertains to make and use the same, reference being had to the accompanying drawings, which form a part of this specification.

My invention relates in general to differential gearing, and more particularly to means for supporting the gearing for rotating the rear axle of an automobile.

In automobiles as usually constructed the rear axle consists in two alined shafts, the inner ends of which are provided with differential gearing by means of which rotary motion is communicated to the axle from the power transmission driven by the engine. Prior to my invention, so far as I am aware, such differential gearing has been supported directly upon the axle, thereby imposing the strain incident to the rotation of the rear axle upon the axle itself.

The primary object of my invention is to provide means for so supporting the differential gearing for rotating two alined shafts, such for instance as constitute the rear axle of an automobile, that the strain will be removed from the axle and resisted by the frame which supports the axle.

A further object of my invention is to provide a device of the character described which will be simple in construction, inexpensive in manufacture, and efficient in operation.

My invention, generally described, consists in two alined shafts, a hollow power transmission member the hubs of which concentrically surround the inner ends of the shafts, gearing mechanism within the transmission member for communicating rotary motion to the two shafts, sleeves surrounding and longitudinally adjustable on the hubs of the transmission member, a yoke within which the transmission member rotates, said yoke having hubs surrounding the portions of the shafts at either side of the transmission member, anti-friction bearings interposed between each of said sleeves and the adjacent hub of the yoke, and means for supporting said yoke, such for instance as the rear springs of an automobile.

My invention will be more fully described hereinafter with reference to the accompanying drawing in which the same is illustrated as embodied in a convenient and practical form, and in which—

Figure 1 is a longitudinal central section, parts of the yoke being shown in elevation; and Fig. 2 a transverse sectional view on line 2—2, Fig. 1.

The same reference characters are used to designate the same parts in the two figures of the drawing.

Reference characters A' and A² designate two alined shafts, such for instance as the two parts of the rear axle of an automobile. When the two shafts constitute the rear axle of an automobile, the outer ends of each has fixed thereon one of the rear wheels, as illustrated in Fig. 1 at the right thereof.

B designates the hub of a wheel from which radiate the spokes $b, b$. The inner ends of the spokes are secured in sockets formed between a disk extending around and preferably formed integral with the inner end of the hub and a removable disk B² mounted on the outer end of the hub and having a sleeve projecting laterally beyond the same. Any suitable means may be provided for securing the spokes to the hub, such for instance as bolts $b'$.

$b^3$ designates keys extending through the hub and engaging recesses in the axle to rigidly unite the wheel thereto.

$a$ designates a nut in screw threaded engagement with the end of the axle and having a flange which engages the end of the hub.

$b^2$ designates the usual cap which covers the end of the axle and the nut thereon.

B' indicates a cylindrical flange carried by the hub which is adapted to be engaged by a brake-band.

C' and C² designate tubes which surround the two alined shafts and are rigidly supported at their outer ends by the frame of the automobile. Each tube is provided at its outer end with an outer tube C having an inwardly extending flange $c^2$ which rests against the end of the tube. A flange $c'$ of greater radius than the tube C extends laterally from the end thereof and forms a race-way in which is located a series of anti-friction rollers D. Such rollers may be of any suitable construction and are shown as journaled at their opposite ends in disks which encircle the shafts. A lining $d$ of hard metal is preferably inserted in the flange c to be engaged by the rollers, while a bushing D' surrounds the shaft to receive the wear incident to the movement of the rollers around the same. The bushing D' is fixed upon the shaft by any suitable means, such for instance as a key d'.

When the shafts constitute the rear axis of an automobile the tube C may afford a convenient support by being secured to the corresponding rear spring of the automobile.

A yoke, preferably formed of two parts, E' and E², is supported upon the inner ends of the tubes C' and C², preferably by means of interiorly screw threaded hubs e' and e² which engage exterior screw threads on the tubes. Located within the yoke is a hollow transmission member F, preferably composed of two portions F' and F². Journaled within the transmission member are pinions G' and G² adapted to freely rotate about rods g' and g². These pinions mesh with gear wheels a' and a² fixed upon the inner ends of the shafts A' and A², and impart rotary motion thereto. The two parts of the transmission member are provided with outwardly projecting hubs f' and f² which surround the shafts and within which the shafts rotate. Sleeves H' and H² surround the hubs f' and f² and are preferably longitudinally adjustable thereon. The means for permitting such longitudinal adjustment are shown as consisting in split collars K' and K² having interior screw threads in engagement with exterior screw threads on the sleeves. The collars are provided with radial flanges which engage the adjacent exterior surfaces of the two parts of the transmission member. k and k² designate clamp screws for uniting the ends of the respective split collars K' and K².

Located within the annular recesses formed in the hubs e' and e² of the yoke are ball bearings L. Such bearings engage the ends of the sleeves H' and H² which are preferably tapered, as indicated in the drawing.

L' and L² designate race-ways seated within the recesses in the hubs of the yoke in which the balls of the bearings are located.

l' and l² designate rings which surround the sleeves H' and H² and engage at their outer peripheries in grooves formed in the raceways L' and L², thereby securely retaining the ball bearings within the race-ways.

Registering longitudinal grooves are formed in the hubs of the transmission member and surrounding sleeves in which keys may be located to prevent the sleeves from rotating relatively to the hubs.

The operation of my invention is as follows: Rotary motion is imparted to the transmission member F from any suitable source of power by means of a sprocket chain engaging the radial teeth on the transmission member. The rotary motion imparted to the transmission member is communicated to the alined shafts through the interposed pinions G' and G² and gear wheels a' and a². As the sleeves H' and H² are non-rotatively secured to the hubs of the transmission member, the wear and strain incident to the rotation of the transmission member is imposed through the ball bearings upon the yoke, and as the yoke is rigidly supported upon the tubes C' and C², which in turn are rigidly secured to the supporting frame, the strain is relieved from the alined shafts and imposed upon the supporting frame by which the yoke is carried.

The wear incident to the rotation of the transmission member relatively to the yoke may be readily taken up by adjusting the sleeves H' and H². Such adjustment of the sleeves may be made by loosening the split collars K' and K² and then screwing the sleeves outwardly with respect thereto, after which the set screws k' and k² are readjusted to tightly clamp the sleeves in their adjusted positions.

The rotary motion communicated to the shafts when they constitute the rear axle of an automobile propels the vehicle by driving the rear wheels fixed on the outer ends of the shafts.

From the foregoing description it will be observed that I have invented mechanism for so supporting the differential gearing which rotates two alined shafts, that the strain and wear incident to the rotation is relieved entirely from the shafts and imposed upon the supporting framework. It will be further observed that the adjacent ends of the shafts are kept in perfect alinement and are securely supported by means of the differential gearing through its engagement with the surrounding yoke.

While I have described more or less precisely the details of construction, I do not wish to be understood as limiting myself thereto, as I contemplate changes in form, the proportion of parts, and the substitution of equivalents, as circumstances may suggest or render expedient, without departing from the spirit of my invention.

Having now fully described my invention, what I claim as new, and desire to secure by Letters Patent, is—

1. The combination with a pair of alined shafts, of a rotary power transmission member having hubs surrounding the adjacent ends of the shafts, exteriorly screw-threaded sleeves keyed upon said hubs so as to be movable axially of the hubs and immovable angularly with respect to the hubs, collars having screw-threads for engaging the screw-threads upon the hubs, the ends of said collars abutting against the sides of said transmission member, circular supports surrounding said hubs, and anti-friction bearings interposed between the ends of said sleeves and said supports.

2. The combination with a pair of alined shafts, of a rotary power transmission member having hubs surrounding the adjacent ends of the shafts, interposed gearing between said member and shafts, axially adjustable sleeves upon said hubs, fixed circular supports surrounding said hubs, anti-friction bearings interposed between the ends of said sleeves and said supports, and split collars at either side of said transmission member surrounding and in screw threaded engagement with said sleeves whereby the latter may be locked in any desired axial adjustment.

3. The combination with a pair of alined shafts, of gears fixed to the adjacent ends of said shafts, a rotary power transmission member surrounding said gears and having hubs surrounding the ends of said shafts, circular bearings surrounding said hubs for supporting said member, and a yoke extending around said member and rigidly uniting said bearings, said yoke being divided into two equal parts on a plane passing midway between said gears.

In testimony whereof, I sign this specification in the presence of two witnesses.

THOS. B. JEFFERY.

Witnesses:
GEO. L. WILKINSON,
C. C. CUNNINGHAM.